Figure 1:
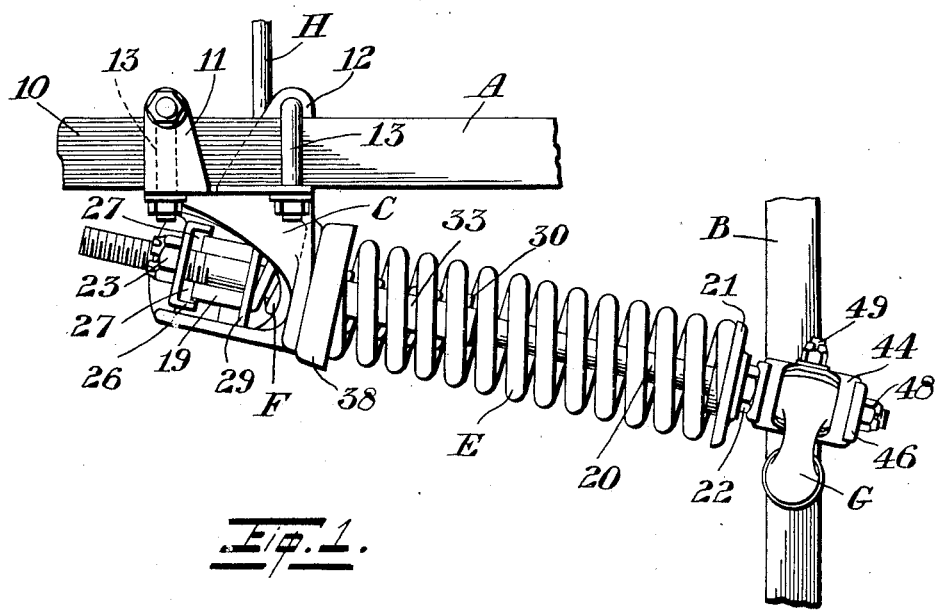

Aug. 6, 1929.  E. J. PILBLAD  1,723,251

SPRING SUSPENSION DEVICE FOR VEHICLES

Filed Aug. 17, 1925  3 Sheets-Sheet 1

INVENTOR.
ERIC. J. PILBLAD.
BY Fetherstonhaugh & Co.
ATT'YS.

Aug. 6, 1929. E. J. PILBLAD 1,723,251
SPRING SUSPENSION DEVICE FOR VEHICLES
Filed Aug. 17, 1925 3 Sheets-Sheet 2
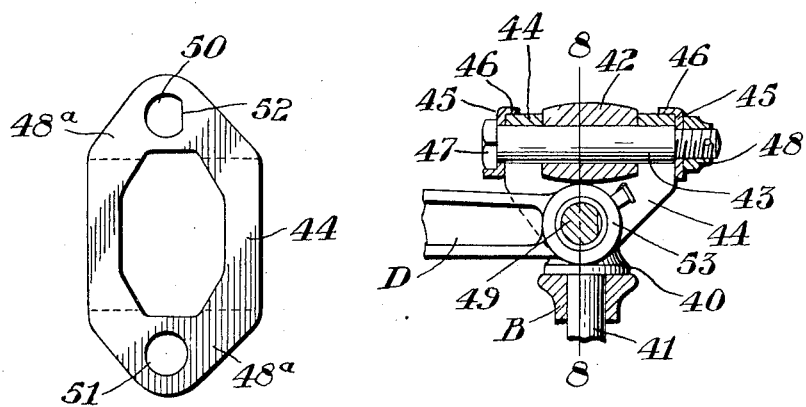
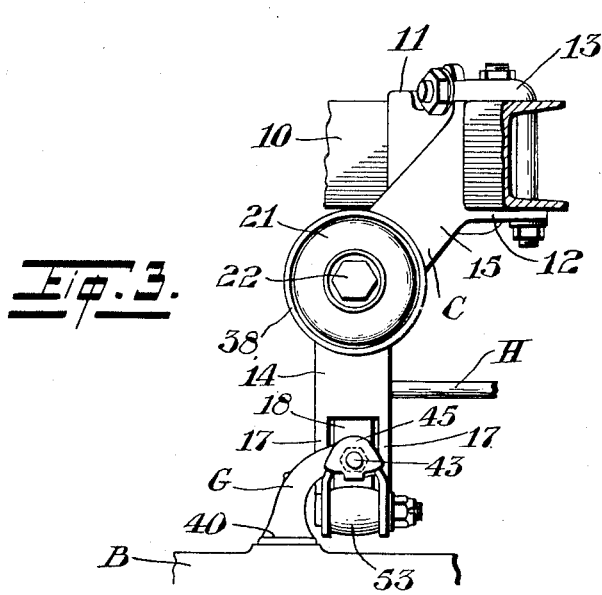
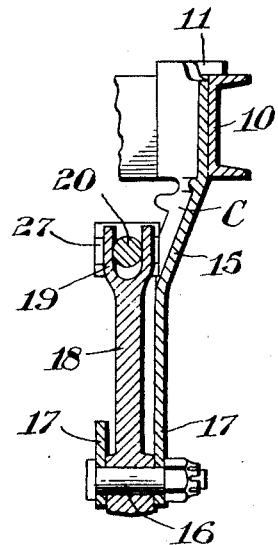
INVENTOR.
ERIC. J. PILBLAD.
BY Fetherstonhaugh & Co.
ATT'YS.

Aug. 6, 1929.  E. J. PILBLAD  1,723,251
SPRING SUSPENSION DEVICE FOR VEHICLES
Filed Aug. 17, 1925  3 Sheets-Sheet 3
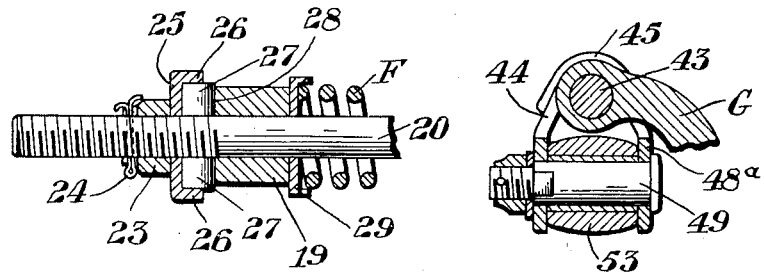
*Fig. 7.*  *Fig. 8.*
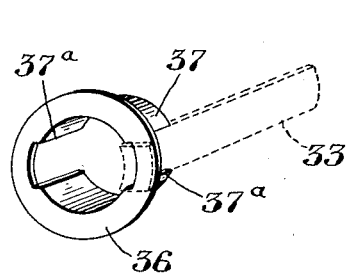 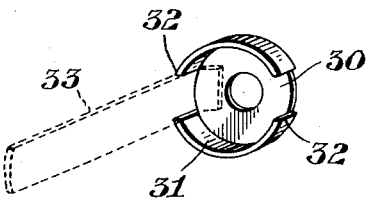
*Fig. 9.*  *Fig. 10.*
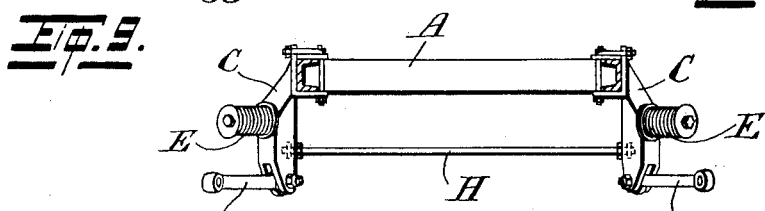
*Fig. 11.*
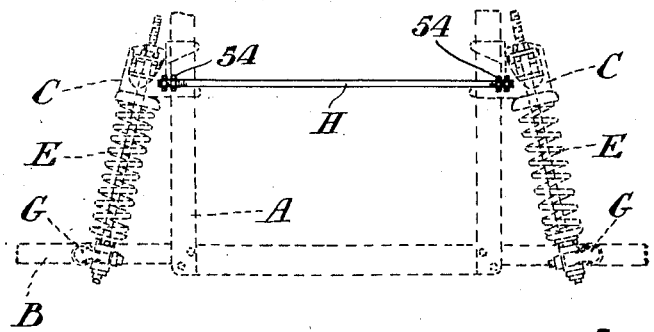
*Fig. 12.*
INVENTOR
ERIC. J. PILBLAD.
BY Fetherstonhaugh & Co.
ATT'YS.

Patented Aug. 6, 1929.

1,723,251

UNITED STATES PATENT OFFICE.

ERIC JULIUS PILBLAD, OF BROOKLYN, NEW YORK, ASSIGNOR, BY MESNE ASSIGN-MENTS, TO LEOPARD AUTOMOBILE PRODUCTS CORPORATION, OF NEW YORK, N. Y., A CORPORATION OF DELAWARE.

SPRING-SUSPENSION DEVICE FOR VEHICLES.

Application filed August 17, 1925. Serial No. 50,668.

This invention relates to spring suspension devices for vehicles of the type in which the load is supported through the medium of spring held supporting members or rocker arms and the objects of the invention are generally to improve and simplify the construction of a device of this kind better to adapt the various parts to perform the functions required of them.

Further objects of the invention are to give effective lateral support to the device in operation and to enable a substantial economy to be effected in the amount of space required for the device, when in operative position.

With these and other objects in view the invention consists of the improved construction and arrangement of parts hereinafter described in detail in the accompanying specification and drawings.

Figure 2:
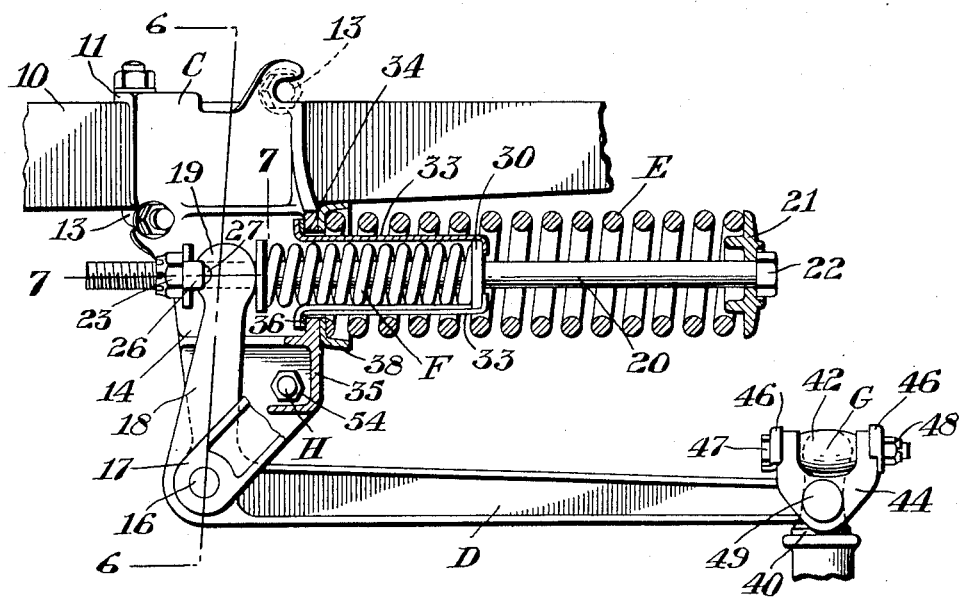

In the drawings,

Figure 1 is a plan view of one of the supporting devices of which preferably four are provided on the vehicle, Figure 2 is a sectional elevation, Figure 3 is an end elevation showing a portion of the chassis of the vehicle in section, Figure 4 is a sectional detail of the fastening device by which the connecting member is secured to the axle of the vehicle, Figure 5 is a plan view of the blank from which the hanger used in the device shown in Figure 4 is formed, Figure 6 is a sectional view on the line 6—6 of Figure 2, Figure 7 is a sectional detail on the line 7—7 of Figure 2, Figure 8 is a sectional view on the line 8—8 of Figure 4, Figure 9 is a perspective detail of the connecting collar between one end of the rebound spring and the supporting member, Figure 10 is a perspective detail showing the sleeve or collar which engages one end of the rebound checking spring, Figure 11 is a front elevation showing two of the spring suspension devices connected by a transversely extending tie rod, and Figure 12 is a plan view showing the tie rod indicated in Figure 11 and also indicating the chassis and two supporting members in dotted lines.

In the drawings like characters of reference indicate corresponding parts in all the figures.

Referring to the drawings, A indicates the chassis of the vehicle and B an axle thereof, C indicates the supporting member which is secured to the chassis and which has pivotally mounted thereon the connection member D. E indicates the load supporting spring and F the rebound checking spring, both connected, as hereinafter indicated, to the connection member D, the rebound checking spring lying for the main part within, and opposed in operation to, the load supporting spring E. The end of the supporting member C is connected to the axle by means of a joining or connecting device G which permits pivotal movement in two planes at right angles to each other.

The supporting member C is designed to be connected to the side member 10 of the chassis, for which purpose the supporting member is conveniently formed with upper and lower lugs 11 and 12, extending at right angles to the supporting member and designed to embrace the side, top and bottom of the member 10, being held in position thereagainst by suitable fastening means such as elbows 13. The body portion 14 of the supporting member, where the devices are to be used at the forward end of the vehicle, preferably extends at an angle to the upper portion, being connected to the upper portion by an obliquely extending section 15.

The connecting member D is conveniently in the form of a bell-crank rocker arm pivotally mounted on a pivot pin 16, held by the flanges 17 on a lower part of the supporting member C. The shorter arm 18 of the supporting member projects upwardly from the pivot pin 16, adjacent to the body portion of the supporting member, being conveniently formed at its upper extremity with a ball shaped head 19, to which the springs E and F are designed to be connected.

The connection between the load supporting spring E and the head 19 is effected by a tie rod 20, which extends longitudinally within the spring E, having one end connected to the spring by an abutment plate 21, through which the tie rod extends, said tie rod being conveniently in the form of a bolt having a head 22 bearing against the plate 21. The opposite end of the tie rod 20 to that connected to the spring E is preferably screw threaded and has mounted thereon a castellated nut 23, designed to be held in adjusted position by means of a split pin 24 and abutting a washer 25 provided with fingers 26 which embrace rollers 27 mounted within suitable recesses 28 provided in the head 19. In this way a rolling contact is provided between the head 19 and the tie rod 20, which extends through the spring E. The opposite end of the head is designed to bear against a washer 29 which seats one end of the rebound checking spring F.

The greater portion of the length of the rebound checking spring F lies within the spring E, being supported at its inner end by means of a collar 30, see Figure 10, having a peripheral flange 31, interrupted at a plurality of points 32 to permit fingers 33 to extend through same, the said fingers being connected at one end to the collar 30 and projecting at the opposite end through an opening 34 in the end wall 35 of the supporting member to a ring 36 mounted on the inner side of the wall 35 of the supporting member, the said ring being formed with a sleeve portion 37 projecting through the opening 34 and being interrupted by slots 37ª, which are cut therein to permit passage of the fingers 33.

The opposite end of the load supporting spring, to that which is connected to the tie rod 20, may be seated against the wall 35 of the supporting member or against an annular spring seat 38.

The connecting device G includes a perch 40, having a pin 41 on the underside, extending through and connected to the axle B, the other portion of the perch being formed with a bearing 42 which journals a cross pin 43, on which the hanger 44 is pivotally mounted, said hanger being conveniently bent from a blank of the form shown in Figure 5, being retained in position on the pin 43 by end washers 45, which are provided with flanges 46 embracing the upper side of the hanger. The pin 43 is conveniently in the form of a bolt having a head 47 at one end and a castellated nut 48 at the opposite end, which head and nut respectively bear against the washers 45. The dependent arms 48ª, on the hanger 44, support a pivot pin 49 which extends through apertures 50 and 51 in the hanger, the aperture 50 having a straight portion 52 therein, which abuts a flat portion on the pin and prevents turning thereof. The pin 49 is also conveniently in the form of a bolt with a head at one end and a castellated nut at the opposite end. The pin 49 is designed to extend through and pivotally support the end of the connecting member D, which is conveniently formed with a bearing member 53, which embraces the pin.

It is found in practice extremely desirable that the lower portions of the supporting member should be given lateral support and to accomplish this I provide a transversely extending tie rod H, having its opposite ends connected to transversely separated supporting members of different spring suspension devices, as shown in Figures 11 and 12, the end of the tie rod being screw threaded and provided with suitable nuts 54, by which it may be adjustably fastened to the supporting member.

The supporting and rebound checking springs will be suitably designed to correspond with the load to be supported and the shape of the supporting member and the length of the connecting member will be arranged to suit the type of chassis or frame of the vehicle on which the device is used.

In operation, the parts being in normal position as shown in Figure 2, when a bump or jar is communicated to the axle B, through the wheel of the vehicle, the outer end of the connecting member D will be raised, the connecting member turning in an anti-clockwise direction. This will compress the load supporting spring E, through the medium of the connecting rod 20, the rebound checking spring F expanding in such a way that it is always exerting a pressure against the head 19, until the limit of movement of the member D is reached. On the return or rebound movement, as soon as the connecting member D passes its normal position, the rebound checking spring F will offer increased resistance to movement in the reverse or clockwise direction, until finally the connecting member will be returned to normal position.

It will be seen that the expansion of the rebound checking spring within the load supporting spring will enable considerable economy of space to be effected. Furthermore, the arrangement is such that both springs are continuous in connection with the end of the supporting member but with separate and independent purchases thereon.

As many changes could be made in the above construction, and many apparently widely different embodiments of my invention, within the scope of the claims, constructed without departing from the spirit or scope thereof, it is intended that all matter contained in the accompanying specification and drawings shall be interpreted in an illustrative and not in a limiting sense.

What I claim as my invention is:

1. A device of the character described comprising in combination a supporting member, a load supporting spring, a rebound checking spring mounted within and opposed to the action of the said supporting spring, a supporting means for said springs, a pivotally mounted connecting member, a tie rod connected to one side of the connecting member and extending through the supporting spring to the outer end thereof, being adapted to compress the said supporting spring during downward movement of the vehicle body, means connecting the opposite side of the supporting member with the rebound checking spring, the said rebound checking spring and load supporting spring being arranged to simultaneously and continuously exert a pressure upon the said connecting member.

2. A device of the character described comprising in combination, a load supporting spring, a rebound checking spring, said springs being opposed to each other and mounted one within the other, a supporting means for said springs designed to be secured to the chassis of a vehicle, a connecting member mounted upon the supporting means and means for forming an operative connection between said springs and the said connecting member with separate and independent abutments for each of said springs.

3. A device of the character described comprising in combination, a pair of laterally spaced brackets designed to be secured to the frame of a vehicle, pivoted connecting members mounted upon said brackets, rebound and checking springs operatively connected to said connecting member, and a tie rod connecting the lower parts of said brackets together.

4. A device of the character described comprising in combination, a pair of laterally spaced brackets designed to be secured to the frame of a vehicle, pivoted connecting members mounted upon said brackets, rebound and checking springs operatively connected to said connecting member, and means for giving lateral support to the lower part of said brackets.

5. A device of the character described comprising in combination, a pair of laterally spaced brackets designed to be connected to the frame of a vehicle, load supporting connecting members mounted upon said brackets, means for giving lateral support to said brackets at points removed from points at which they are to be attached to the frame.

6. A device of the character described comprising in combination, a pair of spaced brackets designed to be secured to the frame members of a vehicle, spring mounted load supporting connecting members on said brackets, a tie rod connecting said brackets at points removed from the points at which they are to be connected to the said frame members.

7. A device of the character described comprising, in combination, a load supporting spring, a rebound checking spring, said springs being opposed in action to each other but mounted one within the other, a supporting member adapted to be secured to the chassis of a vehicle, a connecting member pivotally mounted on the supporting member, a connecting device on the supporting member extending longitudinally within the load supporting spring and connected to the rebound checking spring, and means for connecting both the load supporting spring and the rebound checking spring to the connecting member.

8. The device as claimed in claim 7, in which the connection between the load supporting spring and the connecting member includes a tie rod, a nut on the tie rod, and a bearing plate, abutting the nut, having means to engage with the connecting member.

9. A device as claimed in claim 7, in which a roller connection is formed between the connecting member and the load supporting spring.

10. The device as claimed in claim 7, in which a tie rod extends from the load supporting spring to the connecting member, the connection between the said tie rod and connecting member including a contact roller.

11. The combination with the device as claimed in claim 1, of a bracket, a hanger pivotally mounted on the bracket and adapted to be connected to the connecting member.

12. A device of the character described comprising in combination, a load supporting spring, a rebound checking spring mounted partly within and opposed in action to the supporting spring, said rebound checking spring projecting at one end beyond the supporting spring, a supporting member for both springs adapted to be secured to the chassis of a vehicle, a pivoted rocker arm mounted on the supporting member, means for connecting opposite sides of the rocker arm to the load supporting and rebound checking spring respectively.

13. The device as claimed in claim 12, in which a tie rod extends from one side of the rocker arm to the end of the load supporting spring and in which a seat is provided for the rebound checking spring, bearing against the opposite side of said rocker arm.

14. A device of the character described comprising in combination, a supporting member having an aperture in the side wall thereof, a pivoted rocker arm mounted on the supporting member, a tie rod connected to the rocker arm and projecting through the said aperture, a load supporting spring extending from the tie rod to the supporting member, a rebound checking spring bearing against the connecting member, a supporting device on the supporting member having means projecting through the aperture therein and connected to the outer end of said rebound checking spring.

15. A device of the character described comprising in combination, a supporting member having means thereon to embrace the frame member of a chassis, a pivoted bell-crank arm mounted on the lower part of said supporting member, a tie rod connected to one side of the bell-crank lever, a load supporting spring connected to one end of the tie rod having the opposite end bearing against the supporting member, a rebound checking spring bearing against the end of the rocker arm, a connecting device on the supporting member extending within the load supporting spring and connected to the rebound checking spring.

16. A device of the character described comprising in combination, a supporting member having means thereon to embrace the frame member of a chassis, a pivoted bell-crank arm mounted on the lower part of said supporting member, a tie rod connected to one side of the bell-crank lever, a load supporting spring connected to one end of the tie rod having the opposite end bearing against the supporting member, a rebound checking spring bearing against the end of the rocker arm, a connecting device on the supporting member extending within the load supporting spring and connected to the rebound checking spring, and a connecting device connected to the outer end of the rocker arm having means permitting pivotal movement in two planes, at right angles to each other.

17. The device as claimed in claim 16 in which the last mentioned connecting device comprises a perch, a hanger pivotally mounted on the perch, a bearing pin carried by the hanger and connected to the connecting member.

18. A device of the character described comprising in combination, a supporting member designed to be secured to the chassis of a vehicle, a pivoted rocker arm mounted on the supporting member, a load supporting spring mounted on the supporting member, a rebound checking spring operatively connected to the supporting member, a tie-rod connected to one side of one arm of the rocker arm and to one end of one of said springs, the opposite of said springs bearing directly against the opposite side of the arm of the rocker arm to that to which the tie-rod is connected.

19. A device of the character described comprising in combination a supporting bracket designed to be secured to the chassis of the vehicle, a rocker arm pivotally mounted on the bracket having a short arm and a long arm, a load supporting spring seated at one end on the bracket, a tie rod extending from the opposite end of the load supporting spring to one side of the short arm of the rocker arm, a rebound checking spring bearing against the opposite side of the said short arm to that to which the said tie-rod is connected, the opposite end of said rebound checking spring being operatively connected to the supporting member.

20. The device as claimed in claim 19 in which a connecting device extends from the bracket longitudinally within the load supporting spring and is operatively connected to the rebound checking spring.

21. A device of the character described comprising a supporting bracket, a load supporting spring and a rebound checking spring mounted one within the other on the same side of the said bracket, a pivoted rocker arm mounted on the bracket, one of said springs being adapted to bear directly against one arm of said rocker arm, and a tie rod connecting the other spring with the other side of said arm of the rocker arm.

22. A device of the character described comprising a bracket adapted to be secured to the chassis of a vehicle, a rocker arm pivotally mounted on the bracket, a load supporting spring and a rebound checking spring both mounted upon the same side of the bracket, means connecting one end of the load supporting spring with one side of the rocker arm forming a loose rocking connection therewith, the rebound checking spring bearing directly against the opposite side of the rocker arm.

23. The device as claimed in claim 22 in which the connecting means between the rocker arm and load supporting spring is in the form of a tie-rod and in which the end of the rocker arm is bifurcated to extend on opposite sides of the tie-rod and guide the same.

In witness whereof I have hereunto set my hand.

ERIC JULIUS PILBLAD.